United States Patent
Bok

(10) Patent No.: US 7,884,893 B2
(45) Date of Patent: Feb. 8, 2011

(54) SYSTEM AND METHOD OF TESTING LIQUID CRYSTAL DISPLAY DEVICE USING DISPENSING STATE OF LIQUID CRYSTAL DISPENSING APPARATUS

(75) Inventor: Gu-Yun Bok, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1258 days.

(21) Appl. No.: 11/477,818

(22) Filed: Jun. 30, 2006

(65) Prior Publication Data

US 2007/0151622 A1    Jul. 5, 2007

(30) Foreign Application Priority Data

Dec. 29, 2005    (KR)    ...................... 10-2005-0134585

(51) Int. Cl.
G02F 1/1333    (2006.01)
G02F 1/13    (2006.01)
(52) U.S. Cl. .......................... 349/54; 349/192; 349/187
(58) Field of Classification Search ................... 349/54, 349/192, 187
See application file for complete search history.

(56) References Cited

U.S. PATENT DOCUMENTS

| | | | | |
|---|---|---|---|---|
| 6,610,364 B1 * | 8/2003 | Kweon et al. | ............... | 427/256 |
| 6,864,948 B2 * | 3/2005 | Kweon et al. | ............... | 349/187 |
| 7,365,824 B2 * | 4/2008 | Byun et al. | ................. | 349/187 |
| 2004/0001177 A1 * | 1/2004 | Byun et al. | ................. | 349/187 |

* cited by examiner

*Primary Examiner*—Mike Qi
(74) *Attorney, Agent, or Firm*—McKenna Long & Aldridge LLP

(57) ABSTRACT

Disclosed is a method of testing a liquid crystal display device enabling a quick test by determining a test of a liquid crystal panel according to a liquid crystal filling state of the liquid crystal panel. The method includes: checking a liquid crystal filling state of a liquid crystal panel for a defective liquid crystal filling state; and executing a test of a liquid crystal panel having a defective liquid crystal filling state. The process for testing a liquid crystal filling state may include detecting a dispensed amount of liquid crystal dropped using a liquid crystal dispensing apparatus or may include measuring the weight of liquid crystal dropped. Other methods of identifying the filling state of the liquid crystal panel may be used.

16 Claims, 13 Drawing Sheets

SYSTEM AND METHOD OF TESTING LIQUID CRYSTAL DISPLAY DEVICE USING DISPENSING STATE OF LIQUID CRYSTAL DISPENSING APPARATUS

This application claims the benefit of Korean Patent Application No. 10-2005-0134585, filed on Dec. 29, 2005, which is hereby incorporated by reference for all purposes as if fully set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application, Ser. No. 10/184,096, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a system of testing a liquid crystal display device, and more particularly, to a system and method for testing the quality of a liquid crystal display device.

2. Discussion of the Related Art

With the development of various portable electric devices such as mobile phones, personal digital assistants (PDA), and notebook computers the need for small, light weight and power efficient flat panel display devices for such portable devices has correspondingly increased. Flat panel display device technologies such as liquid crystal display (LCD) technology, plasma display panel (PDP) technology, field emission display (FED) technology, and vacuum fluorescent display (VFD) technology have been actively researched to fill this need. Of these flat panel display devices, the LCD has the advantages of being manufactured using current mass production techniques, and having efficient driving schemes and superior image quality.

An LCD is a device for displaying information on a screen using refractive anisotropy of liquid crystal. As shown in FIG. 1, a typical LCD 1 comprises a lower substrate 5, an upper substrate 3, and a liquid crystal layer 7 formed between the lower substrate 5 and the upper substrate 3. The lower substrate 5 is a driving device array substrate. A plurality of pixels (not shown) is formed on the lower substrate 5, and a driving device such as a thin film transistor (TFT) is formed at each pixel. The upper substrate 3 is a color filter substrate, and a color filter layer for reproducing real color is formed thereon. Further, a pixel electrode and a common electrode are formed on the lower substrate 5 and the upper substrate 3, respectively. An alignment layer is formed on the lower substrate 5 and the upper substrate 3 to align liquid crystal molecules of the liquid crystal layer 7 uniformly.

The lower substrate 5 and the upper substrate 3 are bonded together using a sealing material 9, and the liquid crystal layer 7 is formed therebetween. In operation the liquid crystal molecules of the liquid crystal layer 7 are reoriented by the driving devices formed on the lower substrate 5 to control the amount of light transmitted through the liquid crystal layer to thereby display information.

Fabrication processes for a LCD device can be divided into a driving device array substrate process for forming driving devices on the lower substrate 5, a color filter substrate process for forming the color filter on the upper substrate 3, and a cell process. These processes will be described with reference to FIG. 2 as follows.

The driving device array process includes forming a plurality of gate lines and data lines are on the lower substrate 5 to define pixel areas; forming a thin film transistor connected to both a gate line and a data line at each pixel area (S101); and forming pixel electrodes connected to each thin film transistor to drive the liquid crystal layer according to a signal applied through the thin film transistor.

In the color filter process (S104) R (Red), G (Green), and B (Blue) color filter layers for reproducing the color and a common electrode are formed on the upper substrate 3.

Alignment layers are formed on the lower substrate 5 and the upper substrate 3, respectively, and each alignment layer is rubbed to provide an initial alignment (that is, a pretilt angle and alignment direction) to the liquid crystal molecules of the liquid crystal layer between the lower substrate 5 and the upper substrate 3 through surface anchoring (S102 and S105). Spacers for maintaining the cell gap constant and uniform are dispersed on the lower substrate 5, and the sealing material 9 is applied on a peripheral portion of the upper substrate 3 to bond the lower substrate 5 to the upper substrate 3 under pressure (S103, S106, and S107).

The lower substrate 5 and the upper substrate 3 are made from large glass substrates. The large glass substrates includes a plurality of unit panel areas on which the driving devices such as TFTs and the color filter layer are formed. To fabricate individual liquid crystal unit panels, the assembled glass substrate is cut into unit panels (S 108). Liquid crystal may be injected into the individual liquid crystal unit panel through a liquid crystal injection opening (S109). The filled liquid crystal unit panel is completed by sealing the liquid crystal injection opening. Each sealed liquid crystal unit panel is tested (S110).

In an injection method of the related art for filling liquid crystal unit panels a pressure difference is used to induce the injection of liquid crystal through the liquid crystal injection opening. FIG. 3 shows a device of the related art for injecting the liquid crystal into the liquid crystal panel. As shown in FIG. 3, a container 12 holding the liquid crystal is placed in a vacuum chamber 10. The liquid crystal panel is positioned in an upper portion of the container 12. The vacuum chamber 10 is connected to a vacuum pump used to maintain a vacuum within the vacuum chamber 10. A liquid crystal panel transferring device (not shown) is installed in the vacuum chamber 10 to move the liquid crystal panel into the container 12 to bring the injection opening 16 of the liquid crystal panel 1 into contact with the surface of the liquid crystal 14 (this step is called a liquid crystal dipping injection step).

However, there are problems associated with forming a liquid crystal layer using the injection method of the related art.

First, considerable time is used to inject the liquid crystal into the panel 1. The thickness of the gap between the driving device array substrate and the color filter substrate in the liquid crystal panel may be on the order of magnitude of micrometers, and therefore a very small amount of liquid crystal may be injected into the liquid crystal panel per unit time. For example, it may take about 8 hours to completely inject liquid crystal into a 15-inch liquid crystal panel 1. Thus, the use of the liquid crystal injection method results in increased time to complete the liquid crystal fabrication process, thereby reducing fabricating efficiency.

Secondly, use of the liquid crystal injection method increases the consumption of liquid crystal. A small amount of liquid crystal of the liquid crystal contained in the container 12 is injected into the liquid crystal panel 1. However, when the liquid crystal is exposed to the atmosphere or to a certain gases, the liquid crystal is contaminated by reaction with the gases or atmosphere and by the impurities introduced through contact with the liquid crystal panel 1. Therefore, the remaining liquid crystal in the container 12 is discarded after liquid crystal is injected into a plurality of liquid crystal panels 1, thereby increasing the cost associated with liquid crystal panel fabrication.

SUMMARY OF THE INVENTION

Accordingly, the present invention is directed to a system and method of testing liquid crystal display device using the dispensing state of liquid crystal dispensing apparatus that substantially obviates one or more of the problems due to limitations and disadvantages of the related art.

An advantage of the present invention is to provide a liquid crystal dispensing apparatus for directly dispensing liquid crystal onto a glass substrate of a large area including at least one liquid crystal panel.

Another advantage of the present invention is to provide a system and method of testing a liquid crystal display device, which allow a rapid and accurate test by testing inferiority of a liquid crystal panel on the basis of a dispensed amount measured by a liquid crystal dispensing apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a system of testing a liquid crystal display device including: a dispensing amount checking unit to measure a dispensed amount of liquid crystal dispensed onto a substrate to judge whether the dispensing is defective; and a testing unit to execute a test only for a liquid crystal panel judged to have a defective dispensing of liquid crystal.

In another aspect of the present invention, a method of testing a liquid crystal display device includes checking a liquid crystal filling state of a liquid crystal panel for a defective liquid crystal filling state, and executing a test of a liquid crystal panel having a defective liquid crystal filling state.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

In order to solve the problems of the related liquid crystal injection methods such as the liquid crystal dipping method or the liquid crystal vacuum injection method, a liquid crystal dispensing method has been recently introduced. The liquid crystal dispensing method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dispensing method, the liquid crystal is directly dropped onto the substrate in a short time period so that the liquid crystal layer in an LCD of larger area can be formed quickly. In addition, the liquid crystal consumption can be minimized due to the direct dropping of the liquid crystal as much as required amount, and therefore, the fabrication cost can be reduced.

Figure 4:
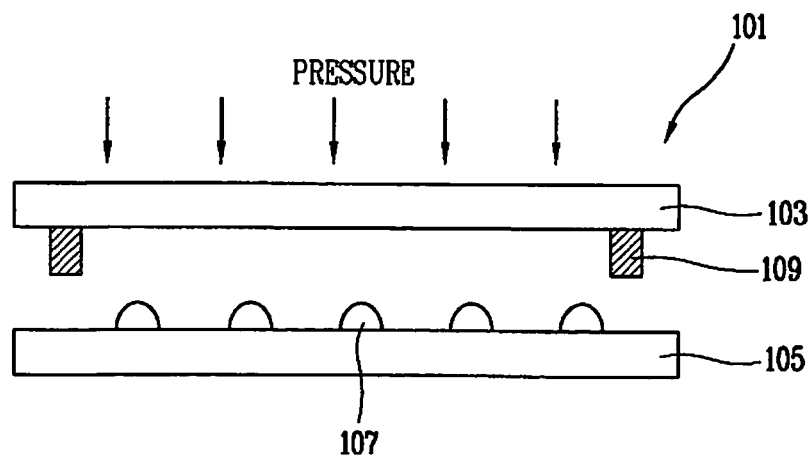
FIG. 4 is a view showing a liquid crystal display device fabricated by a liquid crystal dispensing method.

FIG. 4 is illustrates the basic concept of a liquid crystal dispensing method. As shown in FIG. 4, in the liquid crystal dispensing method, the liquid crystal is dropped onto a lower substrate 105 before assembling the lower substrate 105 and an upper substrate 103 having a driving device array and a color filter respectively. Alternatively, the liquid crystal 107 may be dropped onto the substrate 103 on which the color filter is formed. That is, the liquid crystal 107 may be dropped either on a TFT (thin film transistor) substrate or on a CF (color filter) substrate. The substrate on which the liquid crystal 107 is dropped may be disposed as the lowermost substrate during assembly of substrate 103 and 105.

A sealing material 109 is applied on a peripheral portion of the upper substrate 103, and the upper substrate 103 and the lower substrate 105 are bonded as the upper substrate 103 and the lower substrate 105 are pressed together. During the bonding process, the liquid crystal drops 107 are spread out due to the pressure, thereby forming a liquid crystal layer of uniform thickness between the upper substrate 103 and the lower substrate 105. That is, with the liquid crystal dispensing method, the liquid crystal 107 is dropped onto the lower substrate 105 before the panel 101 is assembled, and subsequently the upper substrate 103 and the lower substrate 105 are attached by the sealing material 109.

Figure 5:
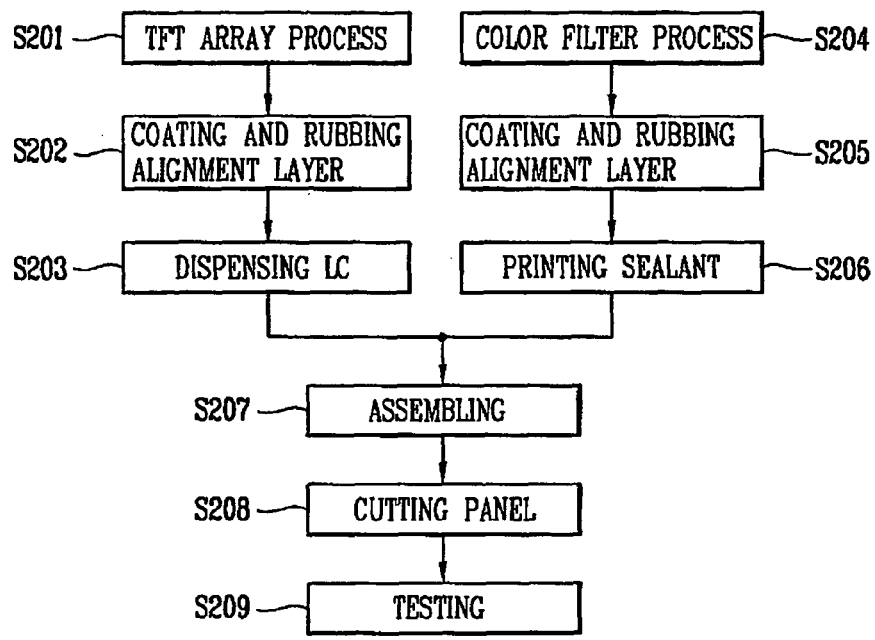
FIG. 5 is a flow chart showing a method of fabricating a liquid crystal display device using a liquid crystal dispensing method.

FIG. 5 shows a method for fabricating the LCD by applying the above liquid crystal dispensing method. As shown, the driving devices such as the TFT and the color filter layers are formed on the lower substrate 105 and on the upper substrate 103 with the TFT array process and the color filter process, respectively (S201 and S202). The TFT array process and the color filter process are generally similar to those of the related art processes illustrated in FIG. 2. These processes are performed on the glass substrates having a plurality of the unit panel areas. By applying the liquid crystal dispensing method to the manufacturing of the LCD, a glass substrates of large area (e.g. having an area of 1000×1200 $mm^2$) can be used.

On the lower and upper substrates 105 and 103 on which the TFT and the color filter layer are respectively formed, the alignment layers are formed and rubbed (S202 and S205). The liquid crystal 107 is dropped onto the liquid crystal unit panel areas of the lower substrate 105, and the sealing material 109 is applied onto the outer portion areas of the liquid crystal unit panel areas on the upper substrate (S203 and S206).

Thereafter, the upper and lower substrates 103 and 105 are disposed facing each other and pressed together to bond to each other using the sealing material. Pressing together the upper 103 and lower substrates 105 causes the liquid crystal 107 to spread out on the entire panel evenly (S207). By this process, a plurality of liquid crystal unit panel areas 101, on which the liquid crystal layers are formed, are formed on the assembled large glass substrates (i.e., the attached lower and upper substrates). The assembled glass substrates are processed and cut into a plurality of liquid crystal unit panels. The resultant liquid crystal unit panels are inspected, thereby finishing the LCD panel process (S208 and S209).

Figure 1:
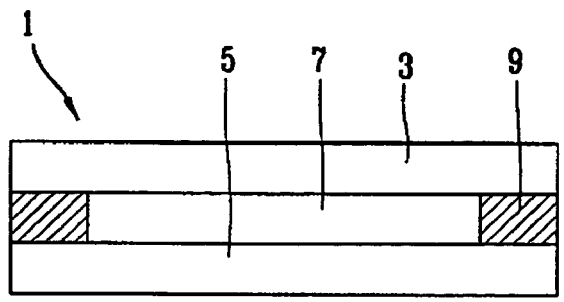
FIG. 1 is a cross sectional view of a typical liquid crystal display device.
Figure 2:
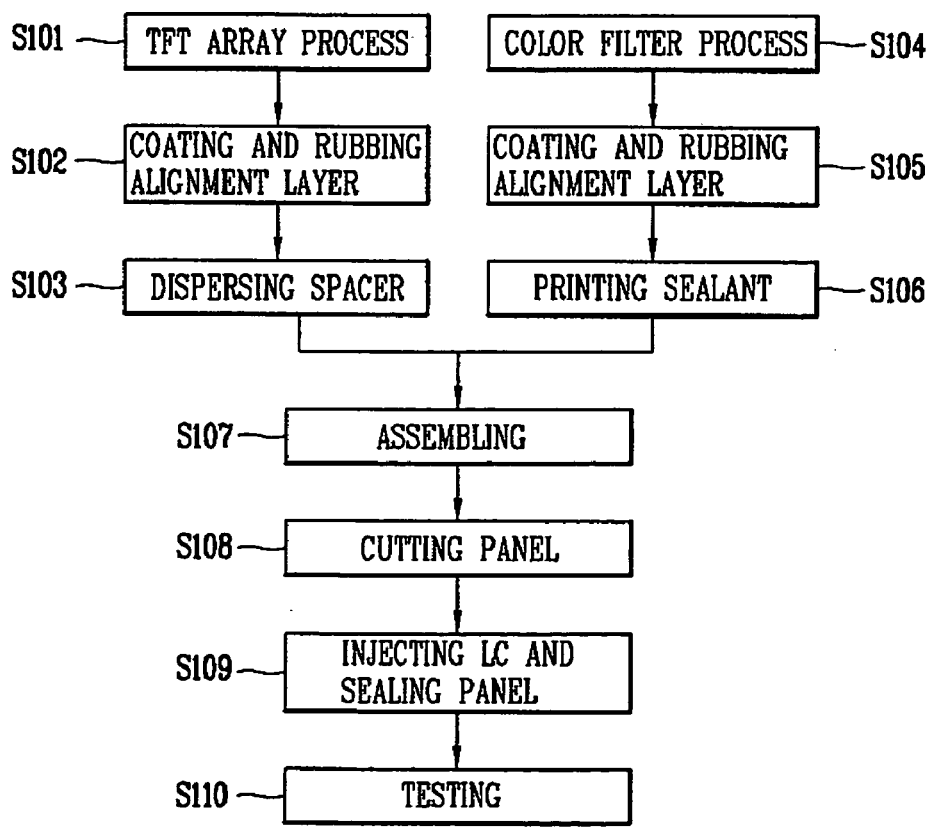
FIG. 2 is a flow chart showing a method of fabricating a liquid crystal display device.
Figure 3:
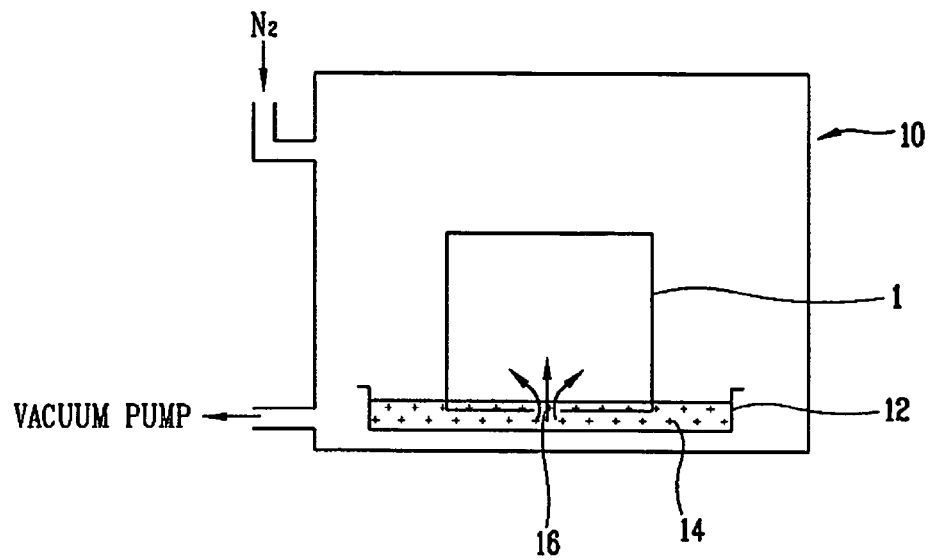
FIG. 3 is a view showing a liquid injection method for a related art liquid crystal display device.

Differences between the method for fabricating the LCD by applying the liquid crystal dispensing method shown in FIG. 5 and the method for fabricating the LCD by applying the related art liquid crystal injection method shown in FIG. 2 will be described as follows. First, the difference in fabricating time between the dropping and injecting of the liquid crystal allows the dispensing method to be usable with larger LCDs. In the injection method for fabricating the LCD of FIG. 2, the liquid crystal is injected through an injection opening and then the injection opening is sealed with a sealing material. However, with the dispensing method of fabricating the LCD, the liquid crystal is dropped directly onto the substrate and a process for an injection opening can be omitted. In addition, in the method for fabricating the LCD by applying the related liquid crystal injection method, the substrate contacts the liquid crystal during the liquid crystal injection process, thereby contaminating the outer surface of the panel. A process for cleaning the substrate may be employed to remove the contamination. However, when using the liquid crystal dispensing method, the liquid crystal is directly dropped onto the substrate. Therefore, the panel is not contaminated by the liquid crystal, and the substrate cleaning process may be avoided. Accordingly, the method for fabricating LCD by the liquid crystal dispensing method is simpler than that by the liquid injection method, thereby improving efficiency and yield.

In the method for fabricating LCD using the liquid crystal dispensing method, the dropping positions for the liquid crystal and the amount of dropped liquid crystal are controlled to form the liquid crystal layer with a desired thickness. Since the thickness of the liquid crystal layer is closely related to the cell gap of the liquid crystal panel, the dropping position and the dropping amount of the liquid crystal are carefully controlled to prevent defects in the resultant liquid crystal panel. An embodiment of the present invention provides a dispensing apparatus for dropping specific amount of liquid crystal at a predetermined position.

Figure 6:
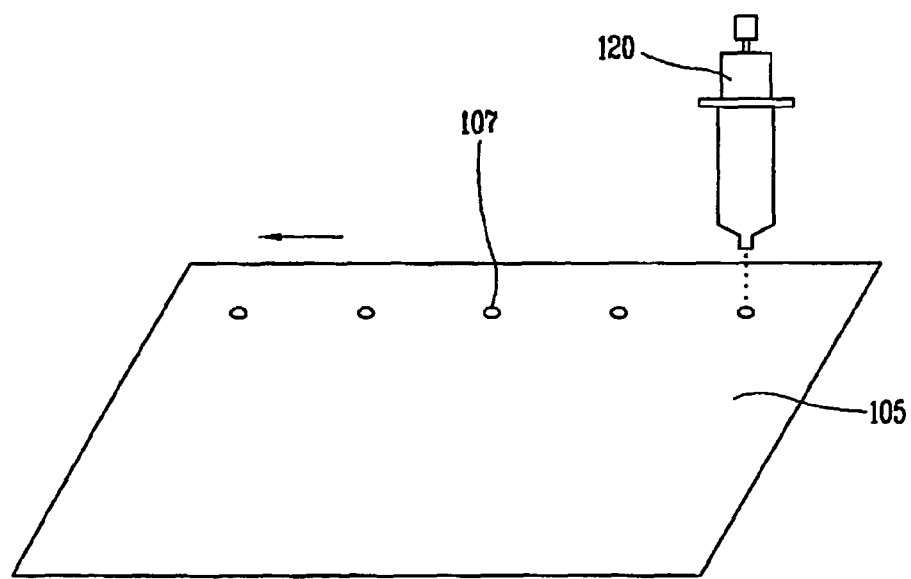
FIG. 6 is a view illustrating the basic concept of a liquid crystal dispensing method.

FIG. 6 shows the basic concept for dropping the liquid crystal 107 onto the substrate 105 (glass substrate of larger area) using the liquid crystal dispensing apparatus 120. As shown, the liquid crystal dispensing apparatus 120 is disposed above the substrate 105. Liquid crystal is contained in the liquid crystal dispensing apparatus 120, and a predetermined amount of the contained liquid crystal is dropped onto the substrate 105.

A precise amount of liquid crystal can be dropped by dispensing liquid crystal using the liquid crystal dispensing apparatus 120. A dispensed amount of liquid crystal can be measured in various ways, for example, by measuring the weight of an amount of liquid crystal dropped from the liquid crystal dispensing apparatus 120 and correlating the measured weight to a volume of liquid crystal, or by detecting the decrease in the amount of liquid crystal contained in the liquid crystal dispensing apparatus 120 as the liquid crystal is dropped. The measurement of the dispensed amount of the liquid crystal is provided to a dispensed amount test unit to determine a dispensing state.

The dispensing state of the liquid crystal is determined because the liquid crystal panel may have a gravitational defect or an underfill defect when the amount of liquid crystal is dropped onto the liquid crystal panel is not proper.

A gravitational defect occurs when the liquid crystal layer formed in the liquid crystal panel becomes too voluminous due to a temperature increase, such that the cell gap of the liquid crystal panel becomes larger than a spacer. When the cell gap increases beyond the size of a spacer, the liquid crystal material can flow downwardly due to gravity, thereby making the cell gap of the LCD panel uneven and deteriorating the quality of the liquid crystal display device.

An underfill defect occurs when a smaller amount of liquid crystal than the proper preset amount is filled into the liquid crystal panel. When pressure is applied to the screen of the liquid crystal display panel having an underfill defect, the liquid crystal of a corresponding region moves to other regions thereby failing to display an image at the corresponding region. Gravitational and underfill defects are major causes of the deterioration of the quality of the liquid crystal display device.

Therefore a testing process for the liquid crystal panel includes a gravitational defect test and an underfill defect test. The gravitational defect test and underfill defect test are performed a user's naked eye observation. Because the gravitational defect test and the filling state defect test take a great deal of time, the tests may be performed on selected samples of the liquid crystal panels rather than being performed on every liquid crystal panel. The use of sampling to select the liquid crystal display panels to test results in a problem that a liquid crystal display device with a gravitational defect or an underfill defect resulting in a low quality liquid crystal display may be produced but not tested.

In an embodiment of the present invention, after measuring a dispensed amount of liquid crystal dropped from the liquid crystal dispensing apparatus 120 to indicate or detect a possible defect of the liquid crystal layer, the dispensed amount information is transmitted to the testing unit of the liquid crystal panel, thereby enabling a rapid and accurate test of the liquid crystal display device. Gravitational and underfill defects of the liquid crystal panel occur mainly because an amount of dropped liquid crystal is smaller or larger than a preset amount. Therefore, the dispensed amount dropped from the liquid crystal dispensing apparatus 120 is measured and the measurement is used to detect whether the dispensing state is acceptable or unacceptable. In particular, the measurement is used to determine whether the dispensed amount of liquid crystal is smaller or larger than a preset dispensed amount, and this information is transmitted to the testing unit.

Figure 7:
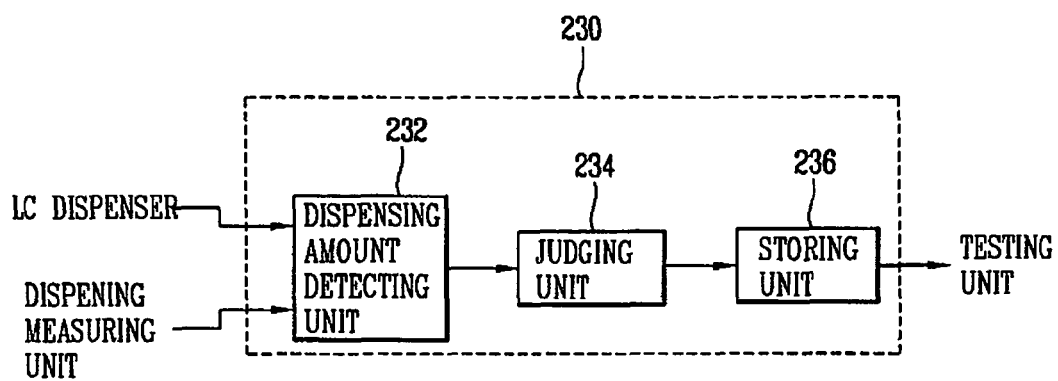
FIG. 7 is a block diagram showing a structure of a dispensed amount checking unit in according to an embodiment of the present invention.
Figure 8:
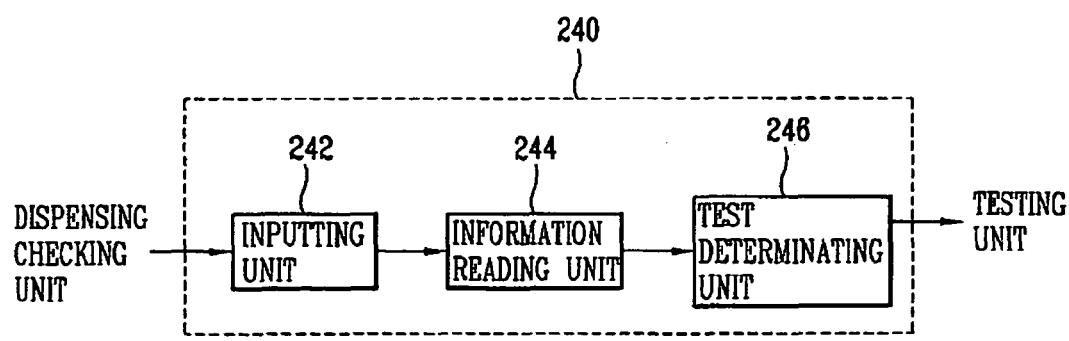
FIG. 8 is a block diagram showing a structure of a testing unit in according to an embodiment of the present invention.

FIGS. 7 and 8 show a dispensing amount checking unit 230 for determining a dispensing state of liquid crystal dropped by a liquid crystal dispensing apparatus and a testing unit 240 executing a test using output from the dispensing amount checking unit.

As shown in FIG. 7, the dispensing amount checking unit 230 comprises: a dispensing amount detecting unit for detecting a current dispensed amount of liquid crystal dropped onto a substrate on the basis of information input from the liquid crystal dispensing apparatus 120 or a dispensing amount measuring apparatus; a judging unit 234 for comparing dispensed amount of liquid crystal detected from the dispensing amount detecting unit 232 with a preset dispensed amount, and judging that the dispensing is good if the detected dispensed amount is within a range of the preset dispensed amount, that is, an allowable limit value, and judging that the dispensing is defective if the detected dispensed amount differs from the preset dispensed amount by more than the allowable limit value; and a storage unit 236 for storing the result judged in the judging unit 234 and the detected dispensed amount for each corresponding liquid crystal panel.

Information input into the dispensing amount detecting unit 232 may include a value obtained by multiplying a single dispensed amount for the liquid crystal dispensing apparatus 120 by a count of the number of times of dispensing; a measurement of a weight decrease from the liquid crystal dispensing apparatus; or weight information measured by a dispensed amount measuring apparatus such as a gravimeter. The dispensing amount detecting unit 232 detects a current dispensed amount of liquid crystal dropped on a substrate on the basis of this information.

The judging unit 234 has a set limit value for the dispensed amount of liquid crystal. The limit value corresponds to the deviation in the dispensed amount from the preset dispensed amount which will not result in a defect. The judging unit 234 judges that a dispensed amount is acceptable if a deviation in the detected dispensed amount of liquid crystal is within a limit value, and judges that a dispensed amount is unacceptable if the deviation in the detected dispensed amount of liquid crystal exceeds a limit value. Additionally, the judging unit 234 makes separate judgments on the case where a dispensed amount of liquid crystal is less than a lowest limit value or on the case where a dispensed amount of liquid crystal is greater than a highest limit value. That is, if a dispensed amount of liquid crystal is less than the lowest limit value, the corresponding code, for example, a code named "LSL (Lower Spec. Limit)" is allocated to the corresponding panel and stored in the storage unit 236. If a dispensed amount of liquid crystal is less than the highest limit value, the corresponding code, for example, a code named "USL (Upper Spec. Limit)" is allocated to the corresponding panel and stored in the storage unit 236. Moreover, if a dispensed amount of liquid crystal is within a limit value, a code named, for example, G, is allocated. The above described codes are only one example for representing quality information for a liquid crystal panel, and other codes may be allocated or no codes may be allocated.

The storage unit 236 stores information identifying the liquid crystal panel formed by attaching the substrates where liquid crystal is dropped and code information determined for the corresponding liquid crystal panel. This information is transmitted to the testing unit 240.

The testing unit 240 makes a determination to perform a test of the liquid crystal panel on the basis of information input from the dispensed amount checking unit 230. As shown in FIG. 8, the testing unit 240 comprises: an input unit 242 for inputting dispensing information on the liquid crystal panel stored in the dispensing amount checking unit 230; an information reading unit 244 for reading the dispensing information of the liquid crystal panel input through the input unit 242; and a test determination unit 246 for determining whether to test the corresponding liquid crystal panel based on the result read by the information reading unit 244.

The information reading unit 244 checks a current dispensing state of the liquid crystal panel by reading the code allocated to the corresponding liquid crystal panel. The test determination unit 246 selects the testing of the liquid crystal display panel to be a gravitational defect test, an underfill defect test, or no test on the basis of the read result.

For example, if a G code is allocated to the current liquid crystal panel, it is determined that the dispensed amount of liquid crystal is normal. The normality of the dispensed amount of liquid crystal indicates that a set amount of liquid crystal has been dispensed. In this case, it is presumed that neither a gravitation defect nor an underfill defect has occurred at the liquid crystal panel. Accordingly, the test determination unit 246 determines to omit testing.

If the LSL code or USL code is allocated, it is judged that a dispensed amount of liquid crystal is not normal, and the test determination unit 246 determines the test to be performed for the liquid crystal panel. For example, if the code allocated to the liquid crystal panel is the LSL code, an underfill detect test is selected and performed, and if the code allocated thereto is the USL code, a gravitational defect test is selected and performed. The allocation of the LSL code or USL code to the liquid crystal panel, that is, the abnormality of the dispensed amount of liquid crystal, does not invariably mean that the liquid crystal panel has a defect. The dropping of liquid crystal is for forming a liquid crystal layer, but an improper dropping of liquid crystal does not mean the formation of a defective liquid crystal layer. Variables associated with other processes, including the bonding of the substrates may result in a normal liquid crystal layer even if there is an abnormality in the dropping of liquid crystal. It should be noted that there is almost no probability of a defect if normal liquid crystal dropping is accomplished, while there is a high probability of a defect if there is an abnormality in terms of a dispensed amount. Thus, it may be efficient to test only the liquid crystal displays for which an abnormality in terms of a dispensed amount of liquid crystal is detected.

Defect information such as codes may be allocated during processes other than the liquid crystal dispensing process. When the liquid crystal display device passes through a number of processes, testing may be carried out after the completion of each process. Accordingly, the defect information may include the result of a test executed by a tester installed on various kinds of process lines.

Once the test determination unit 246 determines to perform a test, the corresponding panel is dispensed onto a gravitational defect testing device or underfill defect testing device to perform the corresponding test.

A method of testing a liquid crystal panel using the above described liquid crystal panel testing system will be described below with reference to FIG. 9.

Figure 9:
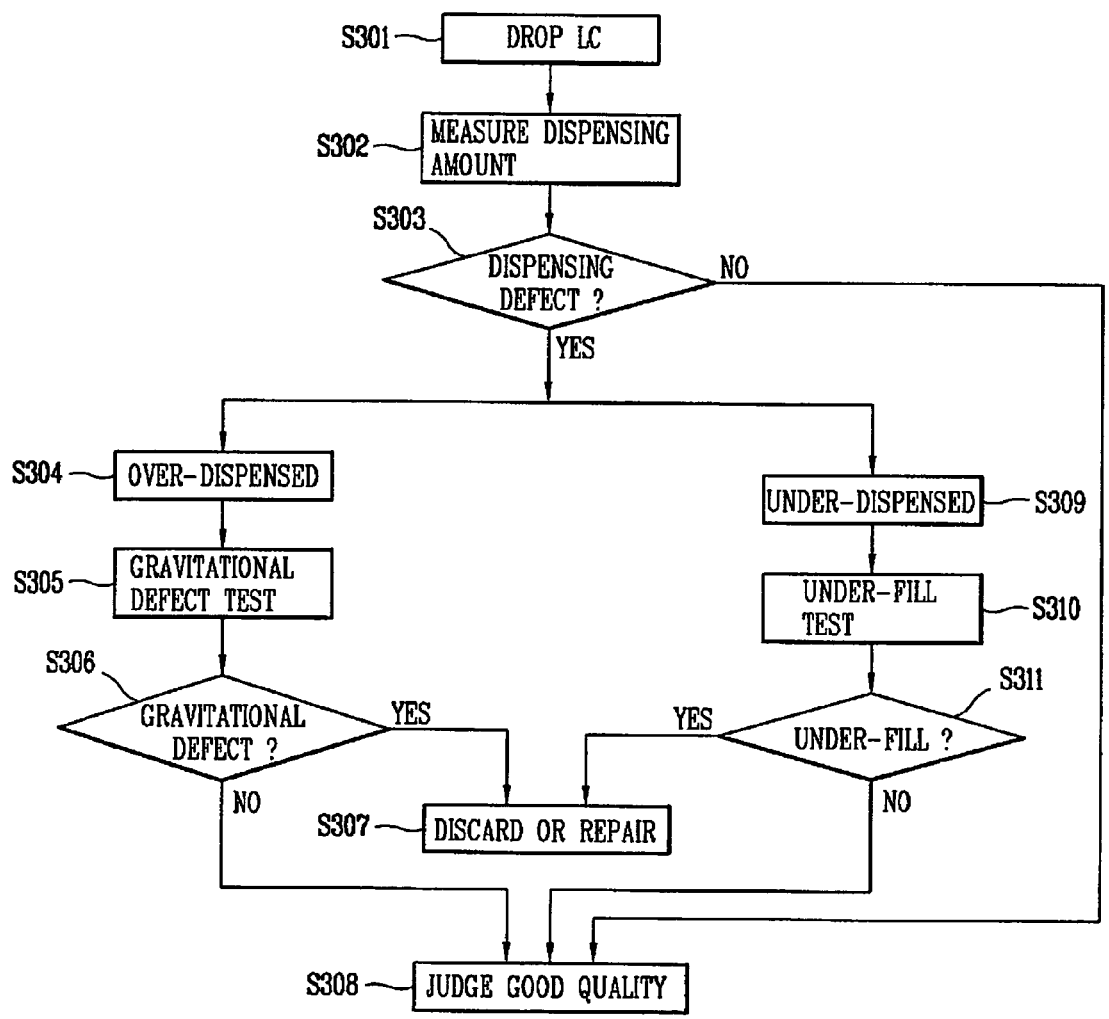
FIG. 9 is a flow chart showing a method of testing a liquid crystal display panel in accordance with an embodiment of the present invention.

First, as shown in FIG. 9, when liquid crystal is dropped onto a substrate using the liquid crystal dispensing apparatus 120 (S301), a dispensed amount of liquid crystal dropped onto the substrate is measured by measuring a decrement of the liquid crystal contained in the liquid crystal dispensing apparatus 120 or by measuring the weight of the liquid crystal dropped from the liquid crystal dispensing apparatus 120 (S302). If the measured dispensed amount is within a set range, it is judged that a normal dropping has been completed, and the testing unit 140 does not perform a gravitational defect test or underfill defect test and judges the corresponding liquid crystal panel to be a non defective product (S308).

If the measured dispensed amount is outside of a set range, it is judged that there is an abnormality in the dispensing (S303). At this time, if the dispensed amount of liquid crystal exceeds the set range (the USL code is allocated), that is, if liquid crystal has been over-dispensed, a gravitational defect test is performed (S304, S305). If a gravitational defect is detected, the corresponding liquid crystal panel is discarded or repaired, and if no gravitation defect is detected, the liquid crystal panel is judged to be a non defective product (S307, S308).

If the dispensed amount of liquid crystal is less than a set range (the LSL code is allocated), that is, if liquid crystal has been under-dispensed, an underfill defect test is performed (S309, S310). If the liquid crystal panel is detected to be in an underfilled state, it is judged to be defective, and the corresponding liquid crystal panel is discarded or repaired, while if the liquid crystal panel is determined not to be in an underfilled state, it is judged to be a non defective product (S307, S308).

As described above, in a method of testing a liquid crystal panel according to an embodiment of the current invention, a gravitational defect test and an underfill defect test are selectively performed based on a dispensed amount of liquid crystal. Thus, every liquid crystal panel suspected to be defective can be tested, thereby preventing or reducing the shipment of defective products.

In the embodiment described above, information related to the dispensed amount of liquid crystal is used to determine whether to perform a gravitational defect test or an underfill defect test of the liquid crystal panel. However, the present invention is not limited thereto. That is, the variable for determining to test for a gravitational defect or an underfill defect of the liquid crystal panel are not limited to a dispensed amount of liquid crystal. For example, the size of a cell gap of the liquid crystal panel may be used as a factor for selecting testing for a gravitational defect or an underfill defect. Moreover, alternative means for checking a dispensed amount of liquid crystal or an amount of liquid crystal filled between substrates may be used. For example, it is also possible to check a liquid crystal layer with a naked eye inspection.

Accordingly, in an embodiment of the present invention, a gravitational defect test and underfill defect test of the liquid crystal panel may be executed based on liquid crystal display cell gap information. For example, if it is observed by the user that a gap in the liquid crystal panel is greater than a set gap, the LSL code is allocated, and an underfill defect test is performed on the liquid crystal panel of this LSL code. If the gap is smaller than the set gap, the USL code is allocated, and a gravitational defect test is performed on the liquid crystal panel of this USL code. This applies in the same way to the checking of a liquid crystal amount using a microscopic examination. It should be noted that these codes are directly allocated by the user because a naked eye check or microscopic examination are performed by the user themselves. That is, the checking will be carried out according to the process as shown in FIG. 9 except that a user may directly allocate information of the liquid crystal panel.

As described above, a dispensed state of liquid crystal or a state of a liquid crystal formed after the dispensing of liquid crystal are checked, and a gravitational defect test or an underfill defect test are performed based on the result thereof. Accordingly, even if every liquid crystal panel is not tested, all of the liquid crystal panels having a high probability of a defect are tested, thereby avoiding or reducing the shipment of defective products.

Meanwhile, the liquid crystal dispensing apparatus 120 according to the present invention is not limited to a specific structure. For example, it may also be possible to use a needle type liquid crystal dispensing apparatus for dropping liquid crystal onto a substrate wherein the apparatus includes a needle connected to a liquid crystal container through a nozzle opened and closed by tension of a spring and a magnetic force of a solenoid coil. Alternately, a pump type liquid crystal dispensing apparatus may use a discharge pump for dropping liquid crystal onto a substrate. Although the following description is made with respect to a liquid crystal dispensing apparatus having a discharge pump, the described apparatus is merely an illustration of an embodiment of the present invention and the invention is not limited to the example described liquid crystal dispensing apparatus.

Figure 10:
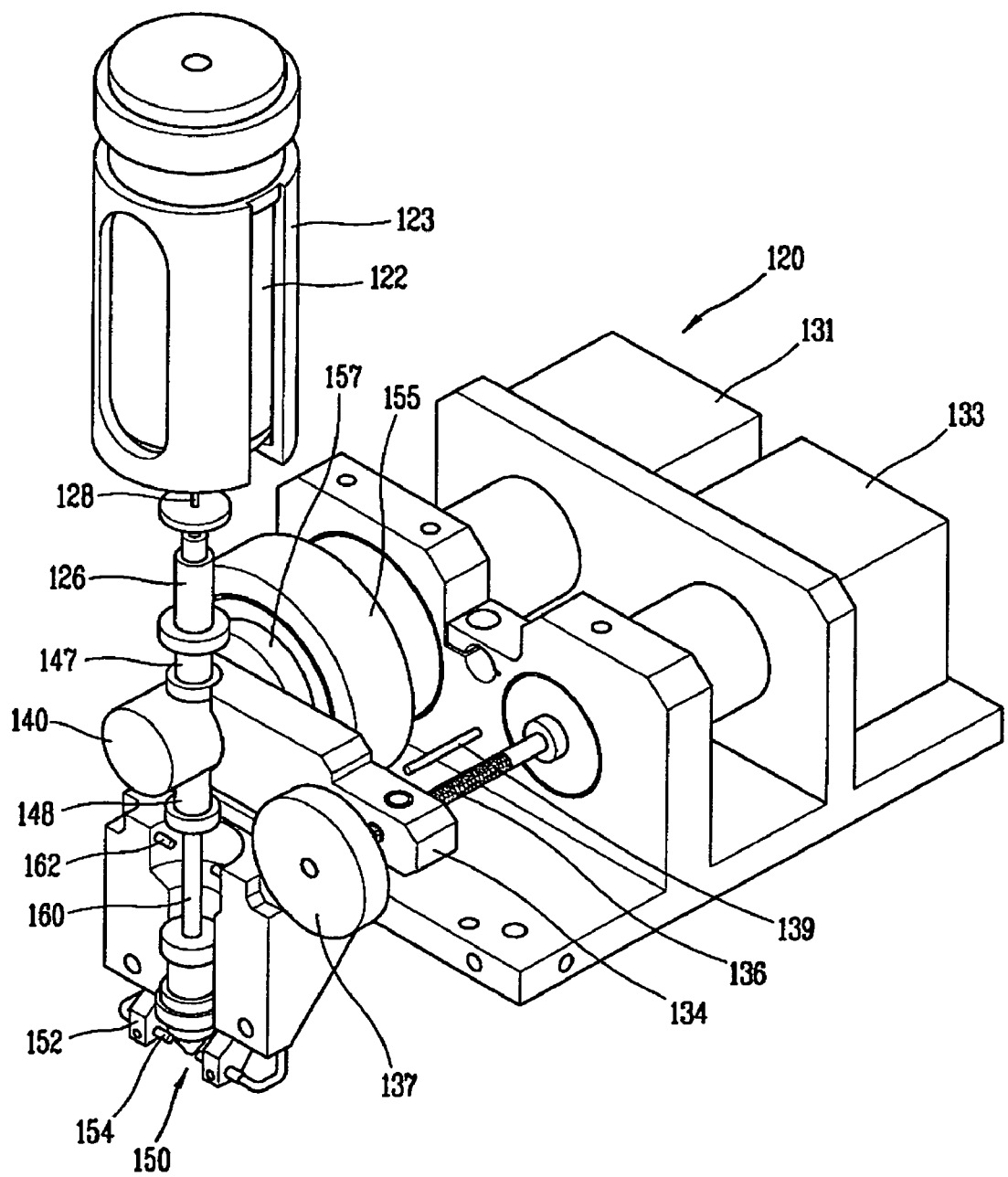
FIG. 10 is a perspective view showing a structure of a liquid crystal dispensing apparatus according to an embodiment of the present invention.
Figure 11:
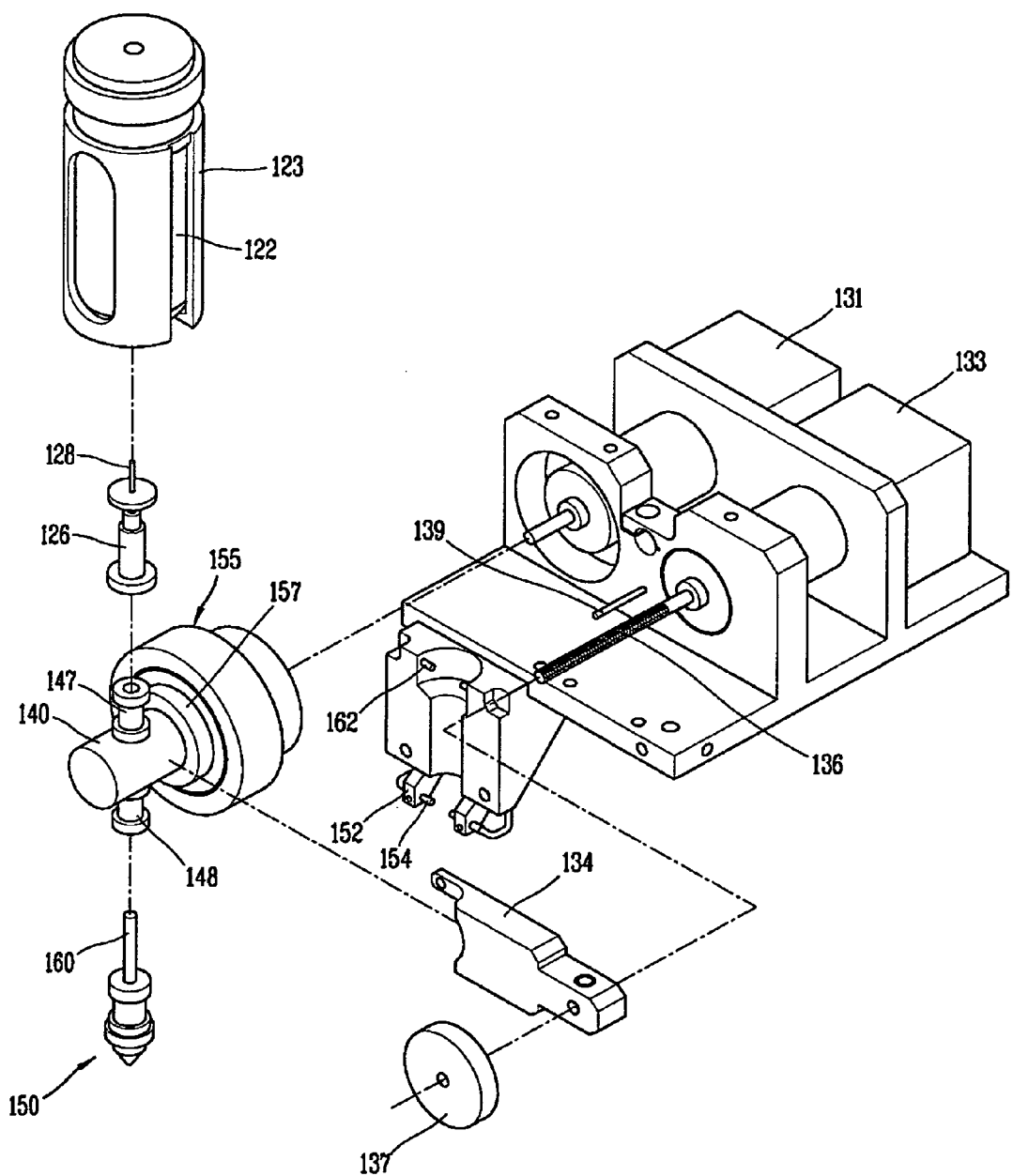
FIG. 11 is an exploded perspective view showing the structure of the liquid crystal dispensing apparatus in accordance an embodiment of the present invention.

FIG. 10 is a perspective view of a structure of a liquid crystal dispensing apparatus in accordance with an embodiment of the present invention, and FIG. 11 is an exploded perspective view of the liquid crystal dispensing apparatus shown in FIG. 10. As shown in FIGS. 10 and 11, the liquid crystal dispensing apparatus 122 may include a cylindrically shaped liquid crystal container 122 encompassed within a case 123. The liquid crystal container 122 may be formed of polyethylene, and the liquid crystal 107 is contained in the liquid crystal container 122. The case 123 may be formed of a stainless steel and encompasses the liquid crystal container 122 therein. Since the polyethylene has a high plasticity, a container of a desired shape can be easily formed with the polyethylene. In addition, the polyethylene is non-reactive with the liquid crystal 107 making the material suitable for containing liquid crystal. However, polyethylene has a low strength and may therefore become easily deformed by application of stress. If the liquid crystal container 122 is deformed, the liquid crystal 107 may not be precisely dispensed onto a substrate. Accordingly, the liquid crystal container 122 may be inserted within the case 123 formed of stainless steel having a high strength.

A gas supply tube may be arranged at an upper portion of the liquid crystal container 122, so that inert gas, such as nitrogen, may be provided thereto. The gas occupies portions of the liquid crystal container 122 not occupied by the liquid crystal 107. Accordingly, the gas exerts pressure on the liquid crystal 107 to induce the liquid crystal material to be dispensed onto the substrate.

Alternatively the liquid crystal container 122 could be made from a metal such as stainless steel. A metallic liquid crystal container 122 is unlikely to be distorted and an outer case 123 may be omitted, thereby reducing fabrication costs of the liquid crystal dispensing apparatus 120. The interior of the liquid crystal container 122 may be coated with a fluorine resin, thereby preventing the liquid crystal 107 contained within the liquid crystal container 122 from chemically reacting with the metal of the container 122.

A liquid crystal discharge pump 140 is arranged at a lower portion of the liquid crystal container 122. The liquid crystal discharge pump 140 can discharge a certain or predetermined amount of liquid crystal from the liquid crystal container 122 onto a substrate. The liquid crystal discharge pump 140 is provided with a liquid crystal suction (or intake) opening 147 connected to the liquid crystal container 122 for drawing in liquid crystal during operation of the liquid crystal discharge pump 140, and a liquid crystal discharge opening 148 at the opposite side of the liquid crystal suction opening 147 for discharging liquid crystal during operation of the liquid crystal discharge pump 140.

As shown in FIG. 11, a first connecting tube 126 is coupled to the liquid crystal suction opening 147. Although the liquid crystal suction opening 147 is shown as being friction coupled to the first connecting tube 126, the liquid crystal suction opening 147 can be coupled to the first connecting tube 126 by a coupling means such as a screw. A pin 128 such as an injection needle of having a hollow interior is formed at one side of the first connecting tube 126. A pad formed of a material having a high compression characteristic and a hermetic sealing characteristic such as silicon or a butyl rubber group material is arranged at a lower portion of the liquid crystal container 122 for discharging liquid crystal to the first connecting tube 126. The pin 128 is inserted into the liquid crystal container 122 through the pad, thereby introducing the liquid crystal 107 of the liquid crystal container 122 into the liquid crystal suction opening 147. When the pin 128 is inserted into the liquid crystal container 122, the pad is strongly compressed by the pin 128, thereby preventing leakage of the liquid crystal 107 at the insertion region of the pin 128. By coupling liquid crystal suction opening 147 to the liquid crystal container 122 using the pin and the pad, the coupling structure is simple and coupling/detachment of the components is facilitated.

Alternatively, the liquid crystal suction opening 147 and the first connecting tube 126 may be formed as a unit. In this case, the pin 128 is formed at the liquid crystal suction opening 147 and is directly inserted into the liquid crystal container 122 using a simple structure.

A nozzle 150 is formed at a lower portion of the liquid crystal discharge pump 140. The nozzle 150 is connected to the liquid crystal discharge opening 148 of the liquid crystal discharge pump 140 through a second connecting tube 160 to drop the liquid crystal 107 discharged from the liquid crystal discharge pump 140 onto the substrate.

The second connecting tube 160 may be formed of an opaque material. However, the second connecting tube 160 may be formed of a transparent material for the following reasons.

At the time of the liquid crystal dropping, if vapor is contained in the liquid crystal 107, the amount of the liquid crystal 107 dispensed onto the substrate may not be precisely controlled. Therefore, the vapor may be removed at the time of the liquid crystal dropping. Vapor in liquid crystal 107 to be contained in the container 122 or vapor in the liquid crystal 107 already in the container 122 can be removed by a vapor removing device, but in some instances the vapor may not be completely removed. Moreover, vapor may be generated when the liquid crystal 107 is introduced into the liquid crystal discharge pump 140 from the liquid crystal container 122. Accordingly, the operation of the liquid crystal dispensing apparatus may be stopped at the time of liquid crystal dropping to remove vapor contained in the liquid crystal 107.

By forming the second connecting tube 160 of a transparent material generation of defective LCD devices may be prevented by revealing vapor contained in the liquid crystal container 122 or vapor generated from the liquid crystal container 122 in the transparent second connecting tube 160. The vapor can be found by a naked eye visual inspection, and can alternatively be automatically detected by a first sensor 162 such as a photo coupler installed at opposites sides of the second connecting tube 160 allowing action to be taken to prevent forming defective LCD devices.

The nozzle 150 into which the discharged liquid crystal is introduced through the second connecting tube 160 may be provided with a protection unit 152 for protecting the nozzle 150 from external stress and etc. at both side surfaces thereof. A second sensor 154 for detecting vapor contained in the liquid crystal dropped from the nozzle 150 and for detecting liquid crystal masses on the surface of the nozzle 150 is installed at the protection unit 152 at the lower portion of the nozzle 150.

The forming of liquid crystal masses on the surface of the nozzle 150 may interfere with a precise dropping of the liquid crystal 107. When the liquid crystal drops through the nozzle 150 having liquid crystal masses formed on the surface, a certain amount of liquid crystal spreads on the surface of the nozzle 150 when a preset amount of liquid crystal is discharged from the liquid crystal discharge pump 140. Accordingly, an amount of liquid crystal less than the preset amount is dispensed onto the substrate. In addition, when a liquid crystal mass from the surface of the nozzle 150 drops on the substrate, a defect in the LCD device may be generated. To prevent the liquid crystal from massing on the surface of the nozzle 150, a hydrophobic material such as fluorine resin having a high contact angle with liquid crystal, may be deposited on the surface of the nozzle 150 by a dipping method or a spray method. The deposition of the fluorine resin reduces or eliminates the spread of liquid crystal on the surface of the nozzle 150 allowing the liquid crystal to be dispensed onto the substrate through the nozzle 150 as a perfect drop shape.

The liquid crystal discharge pump 140 is received within a rotating member 157 that is secured to a fixing unit 155. The rotating member 157 is connected to a first motor 131. As the first motor 131 is operated, the rotating member 157 is rotated and the liquid crystal discharge pump 140 connected to the rotating member 157 is operated.

The liquid crystal discharge pump 140 is in contact with one side of a liquid crystal capacity amount controlling member 134 having a bar shape. A hole is formed at another side of the liquid crystal capacity amount controlling member 134, and a rotational shaft 136 is inserted into the hole. A screw is formed at the perimeter of the hole of the liquid crystal capacity amount controlling member 134 and the rotational shaft 136, so that the liquid crystal capacity amount controlling member 134 and the rotational shaft 136 are screw-coupled to each other. One end of the rotational shaft 136 is connected to a second motor 133, and another end thereof is connected to a controlling lever 137.

The discharged amount of liquid crystal from the liquid crystal material container 122 through the liquid crystal discharge pump 140 is varied according to a fixation angle of the liquid crystal discharge pump 140 to the rotating member 157. In other words, a liquid crystal capacity of the liquid crystal discharge pump 140 is varied according to an angle that the liquid crystal discharge pump 140 is fixed to the rotating member 157. When the second motor 133 connected to the rotational shaft 136 is driven (automatically controlled) or the controlling lever 137 is operated (manually controlled), the rotational shaft 136 is rotated. One end of the liquid crystal capacity amount controlling member 134 is screw-coupled to the rotational shaft 136 and moves back and forth (along a linear direction) along the rotational shaft 136. Accordingly, as one end of the liquid crystal capacity amount controlling member 134 moves, a force applied to the liquid crystal discharge pump 140 is varied, and therefore the fixation angle of the liquid crystal discharge pump 140 is varied.

As described above, the first motor 131 operates the liquid crystal discharge pump 140 to discharge liquid crystal of the liquid crystal container 122 and to drop the liquid crystal onto the substrate. The second motor 133 controls the fixation angle of the liquid crystal discharge pump 140 fixed to the rotating member 157 to control the amount of liquid crystal discharged from the liquid crystal discharge pump 140.

The single dispensed amount of liquid crystal to be dropped onto the substrate through the liquid crystal discharge pump 140 is very minute, and therefore, a variation amount of the liquid crystal discharge pump 140 controlled by the second motor 133 is also minute. Accordingly, to control the discharge amount of the liquid crystal discharge pump 140, an inclination angle of the liquid crystal discharge pump 140 is controlled very precisely. A step motor operated by a pulse input value may be used as the second motor 133 as a method of achieving precise control.

Figure 12A:
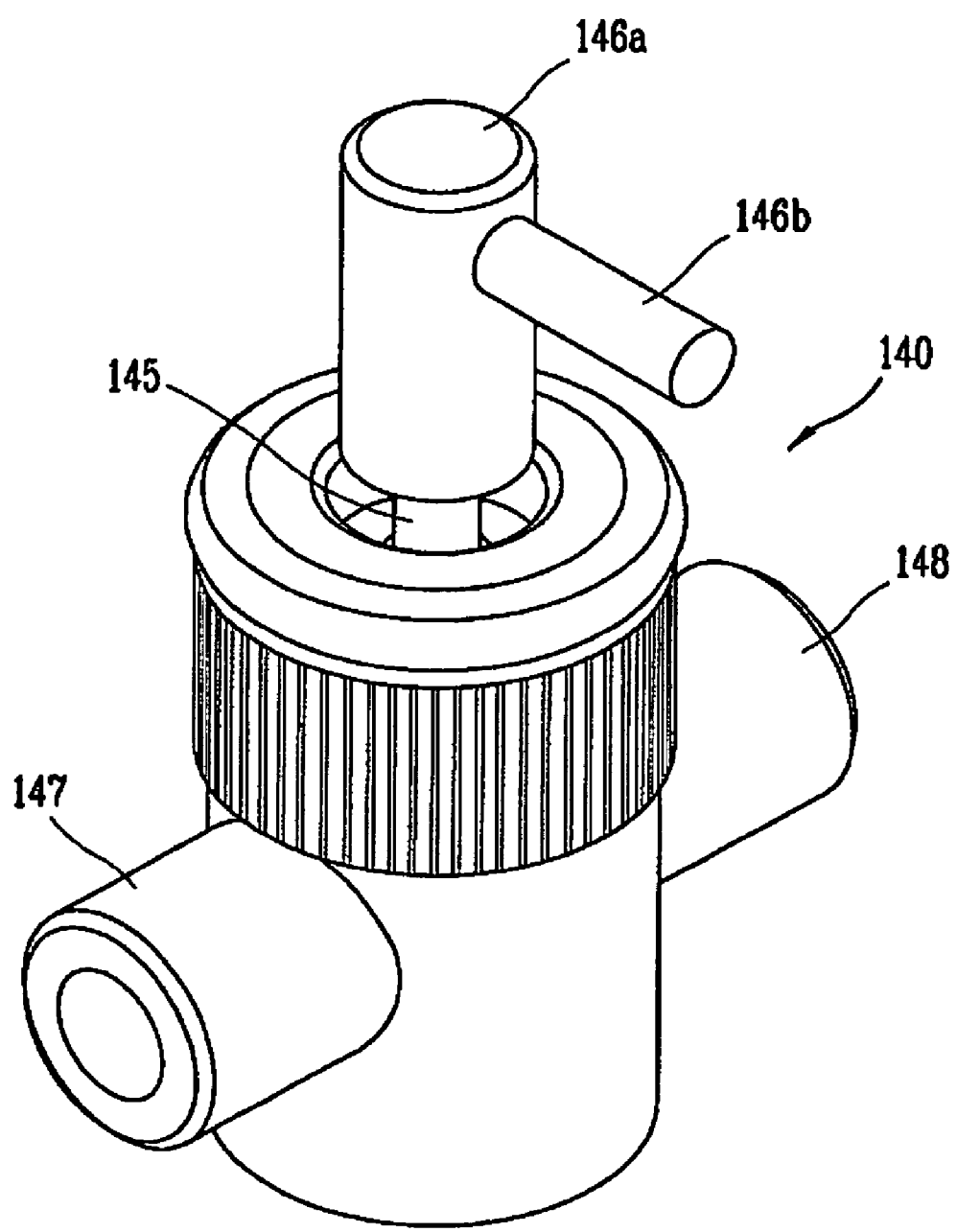
FIG. 12A is a perspective view of a structure of a liquid crystal discharge pump of the liquid crystal dispensing apparatus in accordance with an embodiment of the present invention.
Figure 12B:
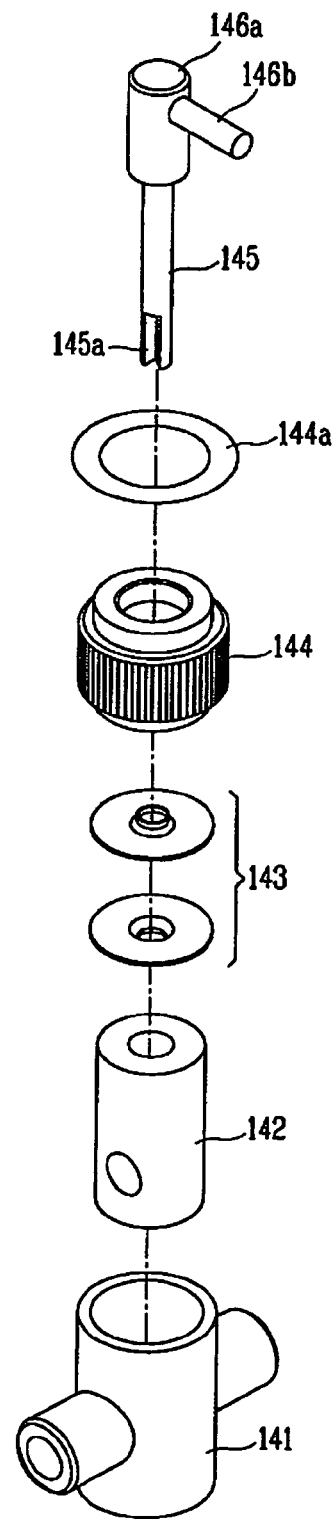
FIG. 12B is an exploded perspective view of the structure of a liquid crystal discharge pump in accordance with an embodiment of the present invention.

FIG. 12A is a perspective view of a structure of a liquid crystal discharge pump, and FIG. 12B is an exploded perspective view of the structure of the liquid crystal discharge pump illustrated in FIG. 12A.

As shown in FIGS. 12A and 12B, the liquid crystal discharge pump 140 includes: a case 141 having the liquid crystal suction opening 147 and the liquid crystal discharge opening 148; a cap 144 having an opening at an upper portion thereof and coupled to the case 141; a cylinder 142 inserted into the case 141 for drawing in liquid crystal; a sealing member 143 for sealing the cylinder 142; an o-ring 144a positioned above the cap 144 for preventing leakage of liquid crystal; and a piston 145 movable up and down and rotatable in the cylinder 142 through the opening of the cap 144, for drawing in and discharging the liquid crystal 107 through the liquid crystal suction opening 147 and the liquid crystal discharge opening 148 respectively. A head 146a fixed to the rotating member 157 is installed above the piston 145, and a bar 146b is installed at the head 146a. The bar 146b is inserted into a hole (not shown) of the rotating member 157 and is fixed to thereby rotate the piston 145 when the rotating member 157 is rotated by the first motor 131.

A groove 145a is formed at the end of the piston 145. The groove 145a has an area corresponding to approximately ¼ (or less) of a sectional area of a circle shape of the piston 145. The groove 145a opens and closes the liquid crystal suction opening 147 and the liquid crystal discharge opening 148 when the piston 145 is cycled (that is, repeatedly moved up and down), thereby drawing in and discharging liquid crystal through the liquid crystal suction opening 147 and the liquid crystal discharge opening 148 respectively.

Operation of the liquid crystal discharge pump 140 will be explained with reference to FIG. 13.

Figure 13:
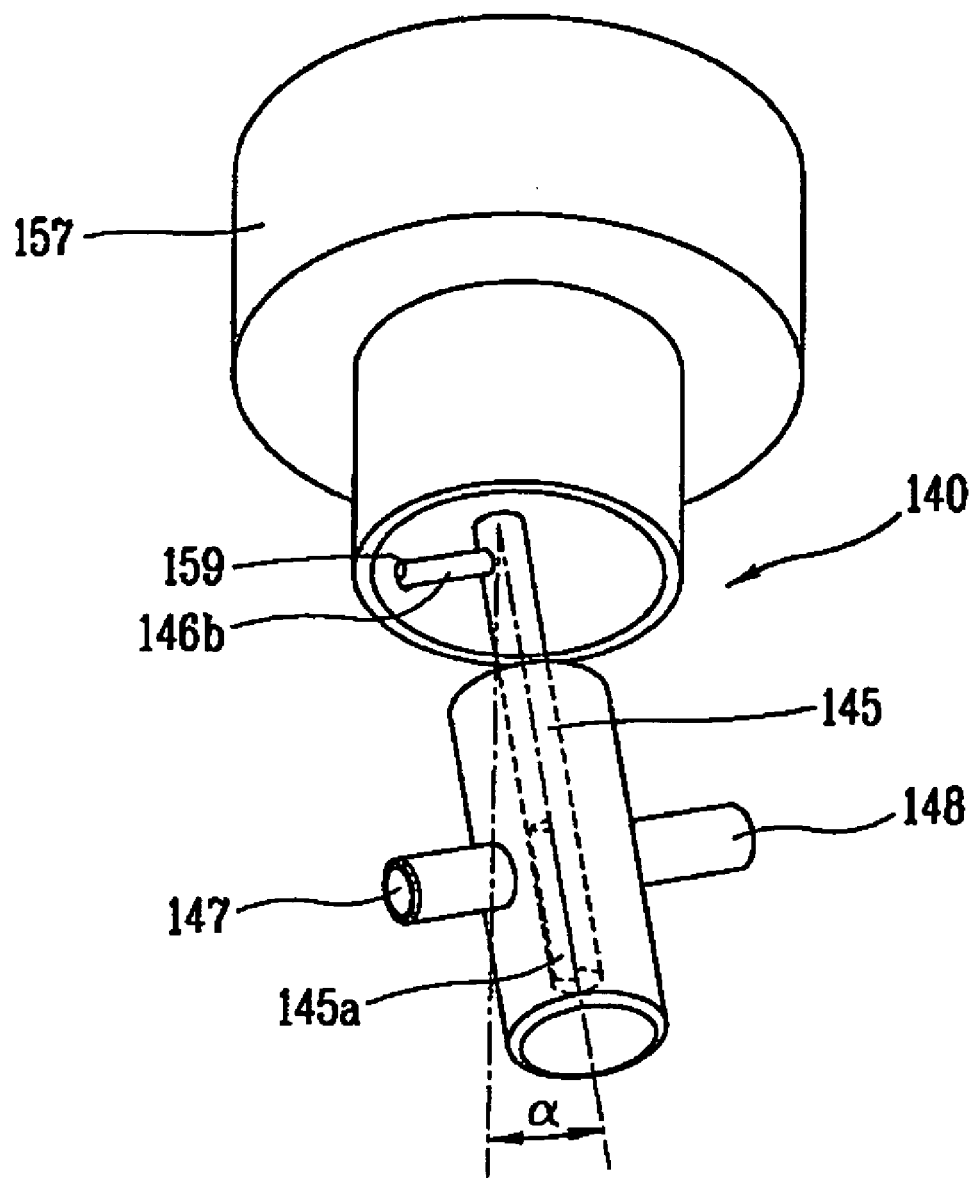
FIG. 13 is a view showing the liquid crystal discharge pump illustrated in FIG. 12B fixed at an angle to the rotating member.

FIG. 13 is a view showing the liquid crystal discharge pump 140 fixed to the rotating member 157. As shown In FIG. 13, the piston 145 is fixed to the rotating member 157 forming a certain angle (α). The bar 146b formed at the piston head 146a is inserted into a hole 159 formed inside the rotating member 157, so that the piston 145 and the rotating member 157 are coupled to each other. Although not shown, a bearing is provided inside the hole 159 and thereby the bar 146b of the piston 145 inserted into the hole 159 can move back and forth and right and left. When the first motor 131 is operated, the rotating member 157 is rotated, thereby rotating the piston 145 coupled (i.e., fixed) to the rotating member 157.

Herein, if the fixation angle (α) of the liquid crystal discharge pump for the rotating member 157, that is, the fixation angle (α) of the piston 145 for the rotating member 157 is set to be 0, the piston 145 performs only a rotational motion along the rotating member 157. However, since the fixation angle (α) of the piston 145 is not 0, substantially (that is, the piston 145 is fixed with a certain angle), the piston 145 not only rotates along the rotating member 157 but also moves up and down.

As the piston 145 moves upward while rotating through a certain angle, a space is formed inside the cylinder 142 and liquid crystal is drawn into the space through the liquid crystal suction opening 147. As the piston 145 moves downward by further rotation, the liquid crystal in the cylinder 142 is discharged through the liquid crystal discharge opening 148. Herein, the groove 145a formed at the piston 145 opens and closes the liquid crystal suction opening 147 and the liquid crystal discharge opening 148 during the drawing in and discharging the liquid crystal by the rotation of the piston 145.

Hereinafter, operation of the liquid crystal discharge pump 140 will be explained in more detail with reference to FIGS. 14A to 14D.

Figure 14A:
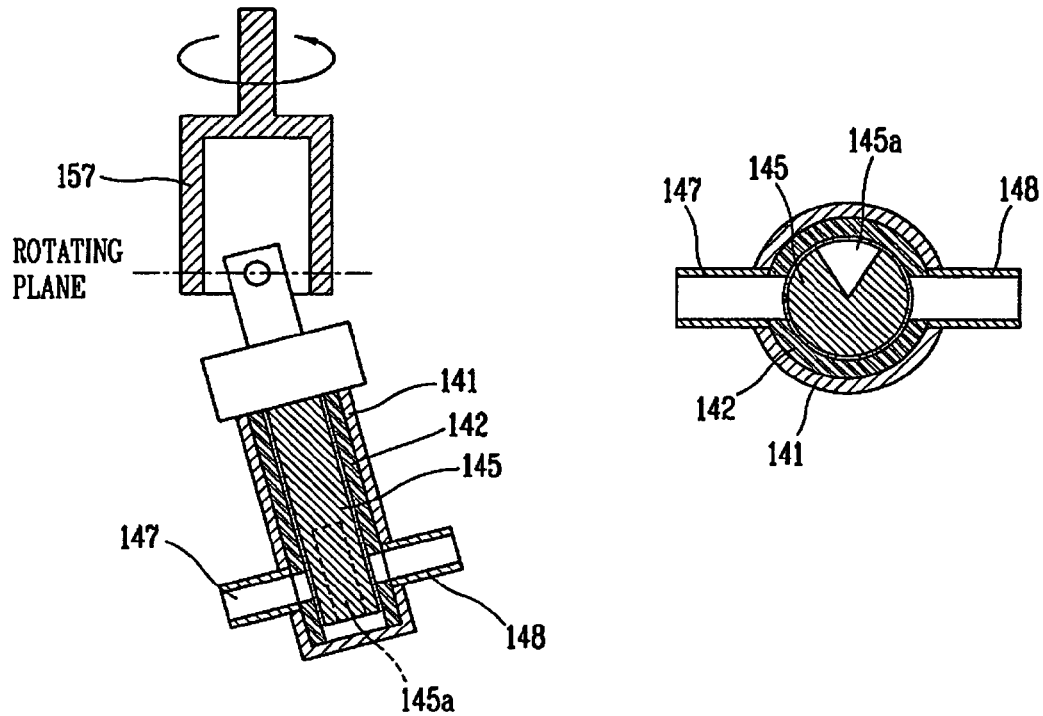
FIGS. 14A to 14D are views showing operation of the liquid crystal discharge pump of FIG. 12B.
Figure 14B:
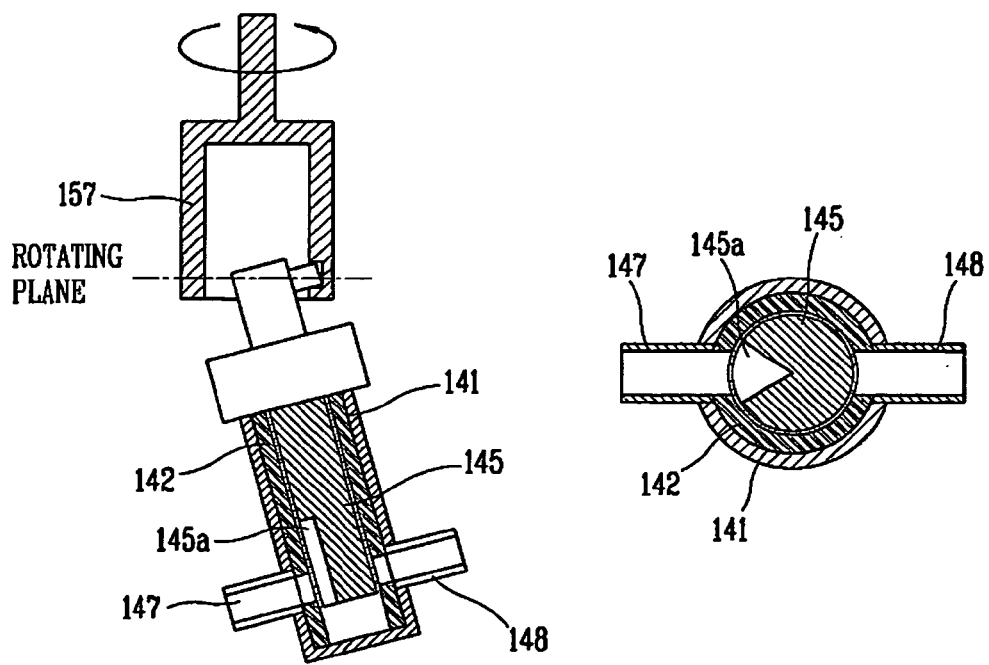
Figure 14C:
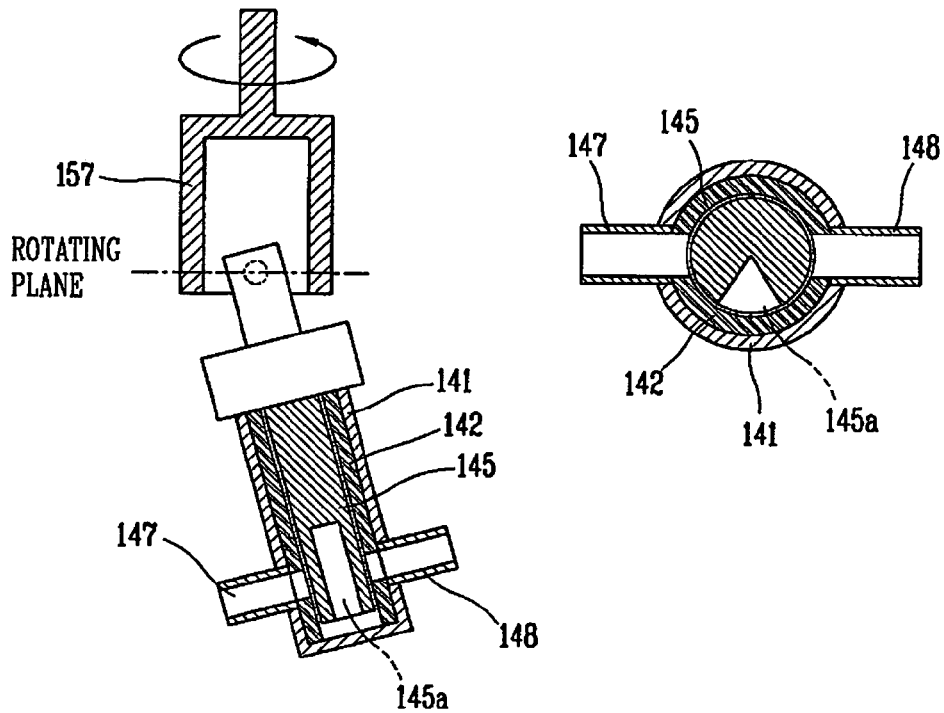
Figure 14D:
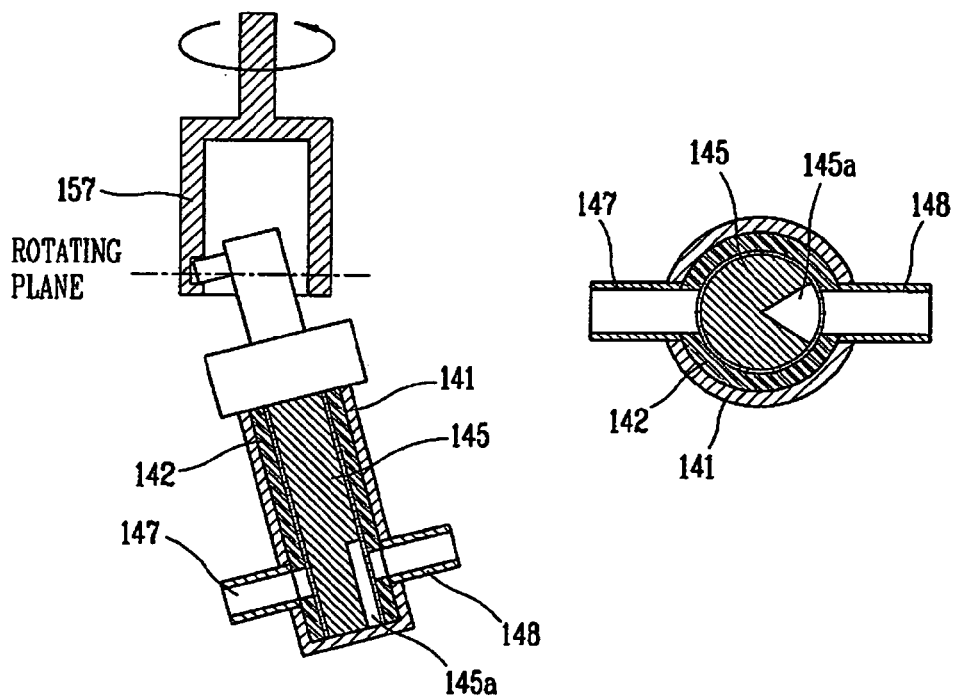

In FIGS. 14A to 14D, the liquid crystal discharge pump 140 discharges the liquid crystal 107 of the liquid crystal material container 122 to the nozzle 150 as the liquid crystal discharge pump 140 operates through 4 strokes. FIGS. 14A and 14C illustrate cross strokes, FIG. 14B is a suction stroke drawing liquid crystal through the liquid crystal suction opening 147, and FIG. 14D is a discharge stroke discharging liquid crystal through the liquid crystal discharge opening 148.

In FIG. 14A, the piston 145 fixed to the rotating member 157 with a certain angle (α) rotates accordingly as the rotating member 157 rotates. At this time, the liquid crystal suction opening 147 and the liquid crystal discharge opening 148 are closed by the piston 145.

When the rotating member 157 rotates through approximately 45°, the piston 145 rotates and the liquid crystal suction opening 147 is open by the groove 145a of the piston 145 as shown in FIG. 14B. The bar 146b of the piston 145 is inserted into the hole 159 of the rotating member 157, thereby coupling the rotating member 157 and the piston 145. Accordingly as the rotating member 157 rotates, the piston 145 rotates. At this time, the bar 146b rotates along a rotating plane.

Since the piston 145 is fixed to the rotating member 157 with a certain angle and the bar 146b rotates along the rotating plane, the piston 145 moves upward as the rotating member 157 rotates. In addition, as the rotating member 157 rotates, a space is formed at the cylinder 142 positioned at the lower portion of the piston 145 since the cylinder 142 is fixed. Liquid crystal is drawn into the space through the liquid crystal suction opening 147 that has been open by the groove 145a.

The suction (or intake) stroke of liquid crystal continues until the cross stroke of FIG. 11C starts (the liquid crystal suction opening 147 is closed) as the rotating member 157 rotates through approximately 45° after the suction stroke starts (that is, the liquid crystal suction opening 147 is open).

Then, as shown in FIG. 11D, the liquid crystal discharge opening 148 is open and the piston 145 downwardly moves accordingly as the rotating member 157 continues to rotates, so that the liquid crystal sucked into the space inside the cylinder 142 is discharged through the liquid crystal discharge opening 148 (discharge stroke).

The liquid crystal discharge pump 140 repeatedly executes four strokes described above including the first cross stroke, the suction stroke, the second cross stroke, and the discharge stroke to discharging liquid crystal 107 contained in the liquid crystal container 122 to the nozzle 150.

Herein, the discharge amount of liquid crystal is varied according to an up-down motion range of the piston 145. The up-down motion range of the piston 145 is varied according to the angle of the liquid crystal discharge pump 140 fixed to the rotating member 157.

Figure 15:
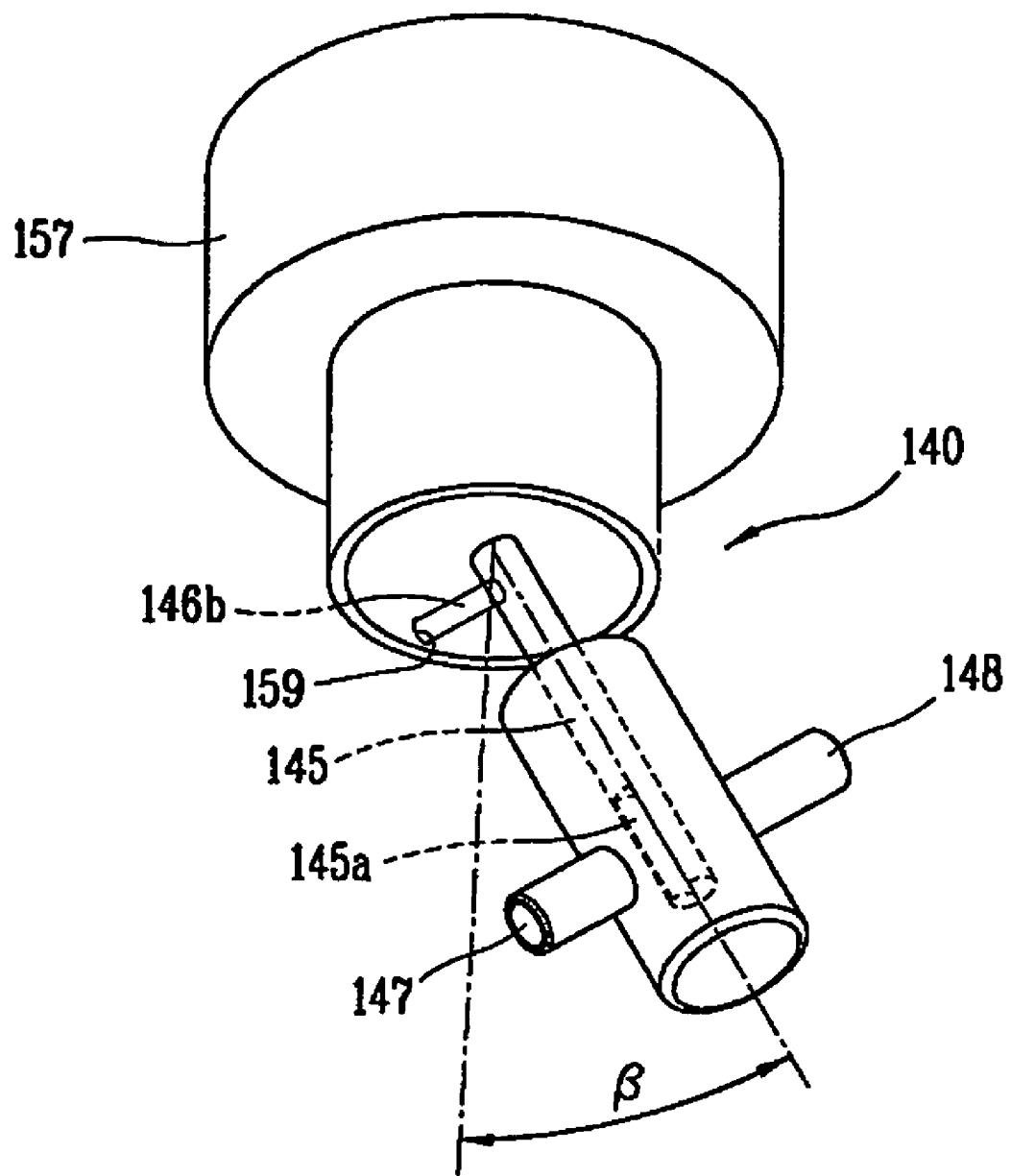
FIG. 15 is a view showing the structure of a liquid crystal discharge pump whose fixation angle is increased beyond that shown in FIG. 13.

FIG. 15 is a view showing the liquid crystal discharge pump is fixed to the rotating member with an angle of β. When compared to the liquid crystal discharge pump 140 of FIG. 10 fixed to the rotating member 157 with the angle of α, the liquid crystal discharge pump 140 of FIG. 12 fixed to the rotating member 157 with an angle of β(>α) enables the piston 145 to move further upward. Accordingly, the greater the angle of the liquid crystal discharge pump 140 fixed to the rotating member 157, the larger the amount of the liquid crystal 107 drawn into the cylinder 142 during the piston motion. As a result, the discharged amount of liquid crystal can be controlled by adjusting the angle of the liquid crystal discharge pump 140 fixed to the rotating member 157.

The angle of the liquid crystal discharge pump 140 fixed to the rotating member 157 is controlled by the liquid crystal capacity amount controlling member 134 of FIG. 7, and the liquid crystal capacity amount controlling member 134 is moved by operating the second motor 133. In other words, the angle of the liquid crystal discharge pump 140 fixed to the rotating member 157 may be controlled by controlling the second motor 133.

The fixation angle of the liquid crystal discharge pump 140 can be manually adjusted by handling the angle controlling lever 137 by the user. However, in this case, a precise adjustment is not possible, a lot of time is required, and the driving of the liquid crystal discharge pump has to be stopped during the operation. Alternatively, the fixation angle of the liquid crystal discharge pump 140 may be adjusted by the second motor 133.

The fixation angle of the liquid crystal discharge pump 140 is measured by a sensor 139 such as a linear variable differential transformer. If the fixation angle exceeds a preset angle, the sensor 139 may control the ringing of an alarm to prevent the liquid crystal discharge pump 140 from being damaged.

As described above, in the present invention, a defect in the dispensing of liquid crystal dispensing or a defect in the a liquid crystal layer after the formation of a liquid crystal layer are checked at the time of dropping liquid crystal, and based on this information, a gravitational defect test or an underfill defect test are selected for execution. Accordingly, every liquid crystal panel suspected to be defective (or having a high probability of having a defect) can be checked, thereby preventing shipment of defective products. Additionally, liquid crystal panels judged to be non defective products (or having a low probability of having a defect) are shipped without being checked, thereby enabling a quick test.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for testing a liquid crystal display device, comprising:

a dispensing amount checking unit to measure a dispensed amount of liquid crystal dispensed onto a substrate to judge whether the dispensing is defective, the dispensing amount checking unit judging whether the dispensed amount exceeds a preset amount of the liquid crystal or the dispensed amount is lowered the preset amount of the liquid crystal; and a testing unit for determining whether to test the corresponding liquid crystal panel on the basis of judgment from the dispensing amount checking unit;

a gravitational defect testing unit to execute a gravitational defect test if the dispensed amount exceeds a preset amount of the liquid crystal; and an underfill testing unit to execute an underfill test if the dispensed amount is lowered the preset amount of the liquid crystal.

2. The system of claim 1, wherein the dispensing amount checking unit comprises:

a dispensing amount detecting unit to measure a dispensed amount of liquid crystal dispensed using a liquid crystal dispensing apparatus;

a judging unit to judge whether a liquid crystal dispensing is defective on the basis of the dispensed amount of liquid crystal measured in the dispensing amount detecting unit; and a storage unit to store a result from the judging unit for each liquid crystal panel.

3. The system of claim 2, wherein the judging unit is to store a limit value of a dispensed amount, and is to judge the dispensing to be defective if the dispensed amount exceeds or is below the limit value by a preset amount.

4. The system of claim 2, wherein the liquid crystal dispensing apparatus comprises:

a discharge pump to draw in and discharge liquid crystal; and a nozzle to dispense liquid crystal discharged from the discharge pump onto a substrate.

5. The system of claim 4, wherein the discharge pump comprises:

a cylinder having a suction opening and a discharge opening; and a piston inserted into the cylinder and having a groove being located at a lower portion of the piston to drawing in and discharge liquid crystal through the suction opening and the discharge opening as the piston moves.

6. The system of claim 1, wherein the testing unit comprises:

an input unit to input dispensing information corresponding to the liquid crystal panel stored into the dispensing amount checking unit;

an information reading unit to read the dispensing information corresponding to the liquid crystal panel input through the input unit; and a test determination unit to determine whether to test the corresponding liquid crystal panel on the basis of the dispensing information read from the information reading unit.

7. The system of claim 1, wherein the dispensing amount checking unit is to judge whether the dispensed amount exceeds a preset amount of the liquid crystal or the dispensed amount is lowered the preset amount of the liquid crystal using a naked eye inspection.

8. A method of testing a liquid crystal display device, comprising:

checking a liquid crystal filling state of a liquid crystal panel whether the dispensed amount exceeds a preset amount of the liquid crystal or the dispensed amount is lowered the preset amount of the liquid crystal; and determining whether to test the corresponding liquid crystal panel;

executing a gravitational defect test if the dispensed amount exceeds a preset amount of the liquid crystal; and executing an underfill test if the dispensed amount is lowered the preset amount of the liquid crystal.

9. The method of claim 8, wherein a dispensed amount of liquid crystal is measured by measuring the weight of liquid crystal dropped.

10. The method of claim 9, wherein a dispensed amount of liquid crystal is measured by measuring a decrement of liquid crystal in the liquid crystal dispensing apparatus.

11. The method of claim 8, wherein checking a liquid crystal filling state of a liquid crystal panel comprises a visual inspection of dropped liquid crystal.

12. The method of claim 8, checking a liquid crystal filling state of a liquid crystal panel comprises checking a cell gap of a liquid crystal panel.

13. The method of claim 8, further comprising allocating a code of inferiority or superiority to the corresponding liquid crystal panel according to the result of the liquid crystal dispensing state.

14. The method of claim 8, wherein the liquid crystal dispensing apparatus comprises:
    a discharge pump to draw in and discharge liquid crystal; and
    a nozzle to dispense liquid crystal discharged from the discharge pump onto a substrate.

15. The method of claim 14, wherein the discharge pump comprises:
    a cylinder having a suction opening and a discharge opening; and
    a piston inserted into the cylinder and having a groove being located at a lower portion of the piston, for drawing in and discharging liquid crystal through the suction opening and the discharge opening, as the piston moves.

16. A method of fabricating a liquid crystal display device, comprising:
    preparing a first substrate and a second substrate;
    dispensing liquid crystal on at least one of the first and second substrates;
    checking a dispensing state of dispensed liquid crystal whether the dispensed amount exceeds a preset amount of the liquid crystal or the dispensed amount is lowered the preset amount of the liquid crystal;
    attaching the first and second substrates to form a liquid crystal panel;
    determining whether to test the corresponding liquid crystal panel;
    executing a gravitational defect test if the dispensed amount exceeds a preset amount of the liquid crystal; and
    executing an underfill test if the dispensed amount is lowered the preset amount of the liquid crystal.

* * * * *